(12) United States Patent
Watanabe et al.

(10) Patent No.: US 7,358,281 B2
(45) Date of Patent: Apr. 15, 2008

(54) HOLLOW POLYMER PARTICLES, AQUEOUS DISPERSION THEREOF AND PRODUCTION PROCESS THEREOF

(75) Inventors: Yasuhisa Watanabe, Yokkaichi (JP); Kouji Tamori, Yokkaichi (JP)

(73) Assignee: JSR Corporation, Tokyo (JP)

( * ) Notice: Subject to any disclaimer, the term of this patent is extended or adjusted under 35 U.S.C. 154(b) by 318 days.

(21) Appl. No.: 10/992,816

(22) Filed: Nov. 22, 2004

(65) Prior Publication Data

US 2005/0113505 A1 May 26, 2005

(30) Foreign Application Priority Data

Nov. 26, 2003 (JP) ............................. 2003-394929

(51) Int. Cl.
*C08F 2/38* (2006.01)
*C08F 2/22* (2006.01)
*C08F 257/02* (2006.01)
*C08J 9/00* (2006.01)
*C08J 9/40* (2006.01)

(52) U.S. Cl. .................... 521/69; 521/70; 521/139; 521/142

(58) Field of Classification Search .................. 521/69, 521/70, 139, 142
See application file for complete search history.

(56) References Cited

U.S. PATENT DOCUMENTS 6,153,658 A   11/2000  Paleja et al.

6,235,810 B1    5/2001  Pavlyuchenko et al.
2002/0068805 A1 *  6/2002  Futami et al. ........... 526/307.5

FOREIGN PATENT DOCUMENTS

| EP | 0 478 829 A1 | 4/1992 |
| EP | 1 321 497 A1 | 6/2003 |
| JP | 62-127336 | 6/1987 |
| JP | 62127336 A * | 6/1987 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

Disclosed are hollow polymer particles composed of a crosslinked polymer having a comparatively small particle diameter and a narrow particle diameter distribution, an aqueous dispersion of the particles, and an ink having good flying property.

The hollow polymer particles are obtained by emulsion-polymerizing a crosslinkable polymerizable monomer composition absorbed in seed particles and containing a crosslinkable monomer component and a hydrophilic monomer component, wherein the seed particles are particles of a polymer having a weight average molecular weight of 500 to 15,000, and obtained by emulsion-polymerizing 100 parts by mass of a non-crosslinkable polymerizable monomer in the presence of 0.01 to 5 parts by mass of a chain transfer agent composed of at least one compound selected from the group consisting of α-methylstyrene dimer, thiuram disulfides and terpene hydrocarbons. The ink contains the hollow polymer particles.

14 Claims, No Drawings

HOLLOW POLYMER PARTICLES, AQUEOUS DISPERSION THEREOF AND PRODUCTION PROCESS THEREOF

BACKGROUND OF THE INVENTION

1. Field of the Invention

The present invention relates to hollow polymer particles, an aqueous dispersion thereof and a production process thereof.

2. Description of the Background Art

Since hollow polymer particles composed of a highly crosslinked polymer have excellent heat resistance and solvent resistance as their properties and exhibit high coating property and shielding property, they are useful as white pigments for inks and also as light-scattering materials for light-scattering sheets.

Various processes have heretofore been known as production processes of hollow polymer particles composed of a crosslinked polymer (see, for example, Japanese Patent Application Laid-Open No. 127336/1987).

According to these processes, however, the resulting hollow polymer particles have involved problems that they become wide in particle diameter distribution, the degree of whiteness thereof becomes low because non-hollow particles of a small diameter coexist in a high proportion, and a high light-scattering ability cannot be obtained. In addition, they have also involved a problem that when they are used as a component of an ink, the resulting ink becomes easy to cause clogging because coarse particles coexist.

SUMMARY OF THE INVENTION

The present invention has been made on the basis of the foregoing circumstances and has as its object the provision of hollow polymer particles composed of a crosslinked polymer and having a comparatively small particle diameter and a narrow particle diameter distribution.

Another object of the present invention is to provide an aqueous dispersion of the hollow polymer particles described above.

A further object of the present invention is to provide an ink containing the hollow polymer particles described above.

A still further object of the present invention is to provide a production process for the hollow polymer particles described above.

According to the present invention, there is thus provided a hollow polymer particle obtained by emulsion-polymerizing a crosslinkable polymerizable monomer composition absorbed in a seed particle and containing a crosslinkable monomer component and a hydrophilic monomer component, wherein the seed particle is a particle of a polymer, having a weight average molecular weight of 500 to 15,000, and obtained by emulsion-polymerizing 100 parts by mass of a non-crosslinkable polymerizable monomer in the presence of 0.01 to 5 parts by mass of a chain transfer agent composed of at least one compound selected from the group consisting of α-methylstyrene dimer, thiuram disulfides and terpene hydrocarbons.

According to the present invention, there is also provided a hollow polymer particle obtained by emulsion-polymerizing a crosslinkable polymerizable monomer composition absorbed in a seed particle and containing a crosslinkable monomer component and a hydrophilic monomer component, wherein the seed particle is a particle of a polymer, having a weight average molecular weight of 500 to 15,000, and obtained by emulsion-polymerizing 100 parts by mass of a non-crosslinkable polymerizable monomer in the presence of 0.01 to 5 parts by mass of a chain transfer agent composed of at least one compound selected from the group consisting of α-methylstyrene dimer, thiuram disulfides and terpene hydrocarbons, and wherein the number average particle diameter of the hollow polymer particle is 0.08 to 3 µm, and the content of a particle belonging to a range of ±10% of the number average particle diameter is at least 50% by mass.

According to the present invention, there is further provided an aqueous dispersion of a hollow polymer particle, comprising the hollow polymer particle described above.

According to the present invention, there is further provided an ink comprising the hollow polymer particle described above.

According to the present invention, there is further provided a process for producing a hollow polymer particle, which comprises adding a crosslinkable polymerizable monomer composition containing a crosslinkable monomer component and a hydrophilic monomer component to an aqueous dispersion of a seed particle to subject the monomer composition to an emulsion polymerization treatment in a state absorbed in the seed particle, wherein the seed particle is a particle of a polymer having a weight average molecular weight of 500 to 15,000, and obtained by emulsion-polymerizing 100 parts by mass of a non-crosslinkable polymerizable monomer in the presence of 0.01 to 5 parts by mass of a chain transfer agent composed of at least one compound selected from the group consisting of α-methylstyrene dimer, thiuram disulfides and terpene hydrocarbons.

The crosslinkable monomer contained in the crosslinkable polymerizable monomer composition is preferably be divinylbenzene.

The hydrophilic monomer is preferably be at least one selected from the group consisting of vinylpyridine, acrylonitrile, methyl methacrylate, 2-hydroxyethyl methacrylate, acrylic acid and methacrylic acid.

In the production process according to the present invention, the crosslinkable polymerizable monomer composition is preferably be added in a proportion of 2 to 500 parts by mass per 1 part by mass of the seed particle.

In the production process according to the present invention, the seed particle preferably has a number average particle diameter of 0.05 to 1.5 µm.

In the production process according to the present invention, the seed particle is preferably be composed of a polymer formed of an ethylenic unsaturated monomer.

In the production process according to the present invention, in the crosslinkable polymerizable monomer composition, the proportion of the crosslinkable monomer component is preferably be 1 to 50% by mass, and the proportion of the hydrophilic monomer component is preferably be 1 to 99% by mass.

In the production process according to the present invention, the emulsion polymerization treatment is preferably be conducted in a state that the crosslinkable polymerizable monomer composition and an oily substance have been absorbed in the seed particle.

According to the present invention, hollow polymer particles composed of a crosslinked polymer and having a small particle diameter, a comparatively narrow particle diameter distribution and high uniformity of particle diameter can be easily and surely provided.

Since the hollow polymer particles are composed of a crosslinked polymer, they are, by themselves, basically excellent in hardness, mechanical strength, heat resistance and solvent resistance and exhibit high coating property and shielding property.

Accordingly, the hollow polymer particles according to the present invention can be suitably applied to various uses as materials for various kinds of inks or paints, coating materials for, for example, a light-scattering sheet, an electronic paper, a paper for ink-jet printers or a paper for thermal transfer printers, and extended-release materials for drugs, whitening agents, etc. utilizing the properties thereof. Besides, they may also be usefully used in other uses than those described above.

DETAILED DESCRIPTION OF THE PREFERRED EMBODIMENTS

The hollow polymer particles of the present invention are produced by adding a crosslinkable polymerizable monomer composition containing a crosslinkable monomer and a hydrophilic monomer as essential components to an aqueous dispersion containing polymer particles as seed particles obtained by emulsion-polymerizing a non-crosslinkable polymerizable monomer composition using a specific chain transfer agent, causing the crosslinkable polymerizable monomer composition to be absorbed in the seed particles and conducting an emulsion polymerization treatment in this state to polymerize the monomers in the crosslinkable polymerizable monomer composition.

The hollow polymer particles according to the present invention are those composed of a crosslinked polymer, preferably those having a number average particle diameter of 0.08 to 3 μm, and the content of particles belonging to a range of ±10% of the number average particle diameter is at least 50% by mass.

<Seed Particles>

The seed particles used in the production of the hollow polymer particles according to the present invention are obtained by indispensably using a chain transfer agent (hereinafter referred to as "specific chain transfer agent") composed of at least one compound selected from the group consisting of α-methylstyrene dimer, thiuram disulfides and terpene hydrocarbons in a proportion within a specific range, optionally with other chain transfer agents in combination, and emulsion-polymerizing a composition of a non-crosslinkable polymerizable monomer which is a polymerizable monomer having no crosslinkability.

In this emulsion polymerization reaction, particles of a polymer having a weight average molecular weight within a specific range can be obtained by using, as a chain transfer agent, the specific chain transfer agent and optionally other chain transfer agents, and by using these polymer particles as seed particles, hollow polymer particles having a comparatively narrow particle diameter distribution can be produced.

In the present invention, the seed particles are particles composed of a polymer having a weight average molecular weight of preferably 500 to 15,000, more preferably 700 to 12,000, particularly preferably 1,000 to 10,000. The term "weight average molecular weight" as to the seed particles as used herein means a weight average molecular weight determined by gel permeation chromatography. The molecular weight of the polymer forming the seed particles can be controlled by the amount of the specific chain transfer agent and other chain transfer agents used in the emulsion polymerization reaction.

Since seed particles composed of particles of a polymer having a weight average molecular weight exceeding 15,000 are low in the ability to absorb the crosslinkable polymerizable monomer composition, and so the crosslinkable polymerizable monomer composition undergoes polymerization by itself in the aqueous medium for the emulsion polymerization without being absorbed in the seed particles, rate of formation of polymer particles having a particle diameter outside the intended range becomes high. In particular, since these particles with exceptional diameter are too small in particle diameter and unstable as colloid particles, the stability of the reaction system in the emulsion polymerization reaction becomes poor, and a coagulated product occurs in a great amount.

On the other hand, seed particles composed of particles of a polymer having a weight average molecular weight lower than 500 are also low in the ability to absorb the crosslinkable polymerizable monomer composition, because the molecular weight thereof is too small, and so the same problem as above occurs.

The particle diameter and particle diameter distribution of the seed particles are factors related to the particle diameter and particle diameter distribution of the hollow polymer particles to be formed. In order to obtain suitable hollow polymer particles, it is preferable to use polymer particles having a controlled particle diameter distribution as narrow as possible and thus having high uniformity of particle diameter, as the seed particles. Specifically, polymer particles having a number average particle diameter of 0.05 to 1.5 μm, preferably 0.1 to 0.6 μm and a narrow particle diameter distribution of, for example, at most 5% in terms of the coefficient of variation are preferably used as the seed particles.

No particular limitation is imposed on the polymer forming the seed particles so far as the crosslinkable polymerizable monomer composition containing a crosslinkable monomer and a hydrophilic monomer used in seed polymerization as essential components is absorbed therein to be a dissolved state or swelled state. However, a polymer formed of an ethylenic unsaturated monomer is generally preferred, with, the same polymer as a polymer composed of a principal monomer component forming the crosslinkable polymerizable monomer composition being particularly preferred. Specifically, particles of a polymer obtained from one of styrene, methacrylic acid, acrylonitrile, vinyl acetate, an acrylic ester such as methyl acrylate or butyl acrylate, butadiene, isoprene, or any other non-crosslinkable polymerizable monomer or a combination of two or more compounds thereof may preferably be used as the seed particles.

The seed particles used in the present invention are those prepared by subjecting a monomer composition containing the above-described non-crosslinkable polymerizable monomer(s) in a comparatively great amount to an emulsion polymerization treatment or soap-free polymerization treatment in the presence of the specific chain transfer agent composed of at least one compound selected from the group consisting of α-methylstyrene dimer, thiuram disulfides and terpene hydrocarbons, particularly preferably α-methylstyrene dimer, and other chain transfer agents used as needed.

α-methylstyrene dimer that is the specific chain transfer agent exists in 3 forms of isomers of (a) 2,4-diphenyl-4-methyl-1-pentene, (b) 2,4-diphenyl-4-methyl-2-pentene and (c) 1,1,3-trimethyl-3-phenylindene. In the present invention, suitably used as α-methylstyrene dimer is that composed of at least 40% by mass of the component (a) and at most 60% by mass of the component (b) and/or the component (c), preferably that composed of at least 50% by mass of the component (a) and at most 50% by mass of the component (b) and/or the component (c), particularly preferably that composed of at least 70% by mass of the component (a) and at most 30% by mass of the component (b) and/or the component (c). A far excellent chain-transferring effect is achieved as the content of the component (a) becomes higher.

α-methylstyrene dimer may contain impurities, for example, unreacted α-methylstyrene and other α-methylstyrene oligomers and polymers than the component (a), component (b) and component (c) so far as they are within a permissible range. α-methylstyrene dimer may be used without purifying after synthesis as it is.

As specific examples of the thiuram disulfides that are the specific chain transfer agents, may be mentioned tetramethylthiuram disulfide, tetraethylthiuram disulfide and tetrabutylthiuram disulfide.

As specific examples of the terpene hydrocarbons that are the specific chain transfer agents, may be mentioned terpinolene, α-terpinene, γ-terpinene and dipentene.

In the present invention, the specific chain transfer agent is preferably used in a proportion of 0.01 to 5 parts by mass, more preferably 0.1 to 4 parts by mass, particularly preferably 0.3 to 3 parts by mass per 100 parts by mass of the non-crosslinkable polymerizable monomer composition for obtaining the seed particles. If no specific chain transfer agent is used, or the specific chain transfer agent is used in a proportion lower than 0.01 parts by mass, the resulting polymer particles becomes wide in particle diameter distribution, resulting in difficulty in producing seed particles having such a narrow particle diameter distribution that the content of particles of particle diameter belonging to the range of ±10% of the number average particle diameter is at least 50% by mass. Namely, coarse particles are formed in a great amount in this case, and hollow polymer particles formed by the subsequent emulsion polymerization treatment are adversely affected. On the other hand, if the amount of the specific chain transfer agent used exceeds 5 parts by mass per 100 parts by mass of the non-crosslinkable polymerizable monomer for obtaining the seed particles, polymerization reactivity in the emulsion polymerization becomes poor, and after all, it is impossible to provide seed particles having a narrow particle diameter distribution.

As the chain transfer agent usable in combination with the specific chain transfer agent, may be used a polymer chain transfer agent used in general emulsion polymerization. As specific examples thereof, may be mentioned mercaptans such as octylmercaptan, n-dodecyl-mercaptan, t-dodecylmercaptan, n-hexadecylmercaptan, n-tetradodecylmercaptan and t-tetradecylmercaptan; xanthogen disulfides such as dimethylxanthogen disulfide, diethylxanthogen disulfide and diisopropylxanthogen disulfide; halogenated hydrocarbons such as carbon tetrachloride and ethylene bromide; hydrocarbons such as pentaphenylethane; and acrolein, metacrolein, allyl alcohol and 2-ethylhexyl thioglycolate. These compounds may be used either singly or in any combination thereof. Among these, mercaptans and xanthogen disulfides are preferably used.

In the emulsion polymerization reaction for obtaining the seed particles, the total amount of the specific chain transfer agent and other chain transfer agent used is 0.01 to 20 parts by mass, preferably 0.1 to 17 parts by mass, particularly preferably 0.3 to 15 parts by mass per 100 parts by mass of the non-crosslinkable polymerizable monomer composition.

In the emulsion polymerization reaction for obtaining the seed particles, the same radical initiator as that used in an emulsion polymerization reaction for obtaining the hollow polymer particles, which will be described subsequently, is used as a radical initiator. The amount used is 0.1 to 3 parts by mass, preferably 0.15 to 2 parts by mass, particularly preferably 0.2 to 1.5 parts by mass per 100 parts by mass of the non-crosslinkable polymerizable monomer composition.

In the emulsion polymerization reaction for obtaining the seed particles, the amount of the aqueous medium composed of, for example, water, used is 100 to 1,000 parts by mass, preferably 150 to 700 parts by mass, particularly preferably 200 to 500 parts by mass per 100 parts by mass of the non-crosslinkable polymerizable monomer composition. With respect to polymerization conditions in the emulsion polymerization reaction for obtaining the seed particles, the temperature is 60 to 95° C., preferably about 70 to 90° C., and the polymerization time is about 2 to 10 hours, preferably about 3 to 8 hours.

<Hollow Polymer Particles>

The hollow polymer particles according to the present invention are obtained by adding a crosslinkable polymerizable monomer composition containing a crosslinkable monomer and a hydrophilic monomer as essential components to an aqueous dispersion containing the seed particles, absorbing the crosslinkable polymerizable monomer composition in the seed particles and conducting emulsion polymerization treatment in this state to polymerize the crosslinkable polymerizable monomer composition.

In the present invention, the crosslinkable polymerizable monomer composition is required to contain both crosslinkable monomer and hydrophilic monomer, and different monomers from each other are generally used as the crosslinkable monomer and the hydrophilic monomer. However, a certain crosslinkable monomer may also be a hydrophilic monomer at the same time. When such a monomer is used, it is only necessary to contain such a monomer alone because this single monomer exhibits both functions of the crosslinkable monomer and the hydrophilic monomer.

[Crosslinkable Monomer]

As the crosslinkable monomer in the crosslinkable polymerizable monomer composition, is used a compound having at least 2 copolymerizable double bonds. As this crosslinkable monomer, may preferably be used divinylbenzene, a polyvalent acrylate compound or the like.

As examples of diacrylate compounds among polyvalent acrylate compounds, may be mentioned polyethylene glycol diacrylate, 1,3-butylene glycol diacrylate, 1,6-hexane glycol diacrylate, neopentyl glycol diacrylate, polypropylene glycol diacrylate, 2,2'-bis(4-acryloxypropyloxyphenyl)propane and 2,2'-bis(4-acryloxydiethoxyphenyl)propane. As examples of triacrylate compounds, may be mentioned trimethylolpropane triacrylate, trimethylolethane triacrylate and tetramethylolmethane triacrylate. As examples of tetraacrylate compounds, may be mentioned tetramethylolmethane tetraacrylate.

As examples of dimethacrylate compounds, may be mentioned ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane glycol dimethacrylate, neopentyl glycol dimethacrylate, dipropylene glycol dimethacrylate, polypropylene glycol dimethacrylate and 2,2'-bis(4-methacryloxydiethoxyphenyl)propane. As examples of trimethacrylate compounds, may be mentioned trimethylolpropane trimethacrylate and trimethylolethane trimethacrylate.

In the present invention, the crosslinkable monomers mentioned above may be used either singly or in any combination thereof. In the present invention, divinylbenzene is preferably used in practice as the crosslinkable monomer, and divinylbenzene may also be used in combination with a polyvalent acrylate compound. Ethylene glycol dimethacrylate or trimethylolpropane trimethacrylate is preferably used as the polyvalent acrylate compound.

In the crosslinkable polymerizable monomer composition according to the present invention, the proportion of the crosslinkable monomer is preferably 1 to 50% by mass, more preferably 2 to 40% by mass, most preferably 5 to 30% by mass based on the total mass of all monomers. If the proportion of the crosslinkable monomer is lower than 1% by mass or exceeds 50% by mass, particles of a crosslinked polymer formed may not become hollow in some cases.

Incidentally, the amount of the crosslinkable monomer is an amount determined in terms of a pure product in which a diluent and other impurities have been removed.

[Hydrophilic Monomer]

In the crosslinkable polymerizable monomer composition, the hydrophilic monomer preferably has a solubility in water of at least 0.5% by mass, particularly at least 1% by mass. As examples of such hydrophilic monomers, may be mentioned aromatic monovinyl compounds such as vinylpyridine, vinyl cyanide compounds such as acrylonitrile and methacrylonitrile, acrylic ester monomers such as glycidyl acrylate and N,N'-dimethylaminoethyl acrylate, methacrylic ester monomers such as methyl methacrylate, 2-hydroxyethyl methacrylate, glycidyl methacrylate and N,N'-dimethylaminoethyl methacrylate, monocarboxylic or dicarboxylic acids such as acrylic acid, methacrylic acid, maleic acid and itaconic acid and anhydrides of dicarboxylic acids, and amide monomers such as acrylamide and methacrylamide. Among these hydrophilic monomers, vinylpyridine, acrylonitrile, methyl methacrylate, 2-hydroxyethyl methacrylate, acrylic acid and methacrylic acid are preferred, with a combination of at least one monomer selected from vinylpyridine, acrylonitrile, methyl methacrylate and 2-hydroxyethyl methacrylate with at least one monomer selected from acrylic acid and methacrylic acid being particularly preferred.

In the crosslinkable polymerizable monomer composition, the proportion of the hydrophilic monomer is preferably 1 to 99% by mass, more preferably 2 to 98% by mass, most preferably 3 to 70% by mass based on the total mass of all monomers. If the proportion of the hydrophilic monomer in the crosslinkable polymerizable monomer composition is lower than 1% by mass, particles of a crosslinked polymer formed may not become hollow in some cases.

[Other Monomers]

In crosslinkable polymerizable monomer composition, another or other polymerizable monovinyl monomer(s) than the crosslinkable monomer and hydrophilic monomer may be contained. As examples of the polymerizable monovinyl monomers, may be mentioned aromatic monovinyl compounds such as styrene, ethylvinylbenzene, α-methylstyrene and fluorostyrene, acrylic ester monomers such as butyl acrylate and 2-ethylhexylethyl acrylate, and methacrylic ester monomers such as butyl methacrylate, cyclohexyl methacrylate and 2-ethylhexyl methacrylate.

The crosslinkable polymerizable monomer composition may also contain conjugated double bond compounds such as butadiene and isoprene, vinyl ester compounds such as vinyl acetate, and α-olefin compounds such as 4-methyl-1-pentene within limits that the polymerization rate and polymerization stability in the emulsion polymerization reaction thereof are permissible. Among these compounds, styrene, ethylvinylbenzene or α-methylstyrene is particularly preferred. These polymerizable monovinyl monomers may be used either singly or in any combination thereof.

The amount of the polymerizable monovinyl monomers used is preferably at most 98% by mass, more preferably at most 96% by mass, most preferably at most 92% by mass based on the crosslinkable polymerizable monomer composition.

[Amount of Crosslinkable Polymerizable Monomer Composition Used]

In the present invention, the amount of the crosslinkable polymerizable monomer composition used is generally 2 to 500 parts by mass, preferably 2 to 200 parts by mass, more preferably 3 to 19 parts by mass, particularly preferably 4 to 16 parts by mass, most preferably 5 to 12 parts by mass per 1 part by mass of the seed particles. If the amount used is less than 2 parts by mass, particles of a polymer formed may not become hollow in some cases. If the amount of the crosslinkable polymerizable monomer composition used exceeds 500 parts by mass on the other hand, the monomer-absorbing ability that the seed particles have as a whole is insufficient, so that an amount of the crosslinkable polymerizable monomer composition not absorbed in the seed particles increases in emulsion polimerization reaction system. As a result, when for example, an oil-soluble initiator is used, it is difficult to control the particle diameter, so that the polymer particles formed become wide in particle diameter distribution and include coarse particles. When a water-soluble initiator is used on the other hand, a great amount of fine particles are produced to make the emulsion polymerization reaction system unstable. Accordingly, the intended hollow polymer particles cannot be produced with high efficiency.

[Emulsion Polymerization Reaction Treatment]

As a method for adding the crosslinkable polymerizable monomer composition to the aqueous dispersion of the seed particles, may be used any of a lump addition method that the crosslinkable polymerizable monomer composition is charged at a time, a divisional addition method that the crosslinkable polymerizable monomer composition is added in portions while carrying out the emulsion polymerization reaction, and a continuous addition method that the crosslinkable polymerizable monomer composition is continuously added. However, the lump addition method is preferred in the present invention.

In the present invention, the amount of the seed particles and crosslinkable polymerizable monomer composition used can be controlled, thereby the particle diameter of the finally resulting hollow polymer particles composed of the crosslinked polymer can be controlled.

The range of the particle diameter of the resulting hollow polymer particles is mainly determined by the size of the particle diameter of the seed particles used. However, hollow polymer particles having a number average particle diameter ranging from 0.08 to 3 μm, preferably from 0.1 to 1 μm are easily obtained.

In the present invention, as a polymerization initiator used in the emulsion polymerization reaction of the crosslinkable polymerizable monomer composition, may be used a water-soluble or oil-soluble radical polymerization initiator commonly used. However, the use of the water-soluble polymerization initiator is preferred in that the crosslinkable polymerizable monomer composition, which remains unabsorbed in the seed particles, has little possibility of initiating polymerization in a water phase.

As examples of the water-soluble radical initiator, may be mentioned potassium persulfate, sodium persulfate, ammonium persulfate, cumene hydroperoxide, hydrogen peroxide, and redox initiators composed of a combination of these compounds with a reducing agent.

On the other hand, as examples of the oil-soluble polymerization initiator, may be mentioned benzoyl peroxide, α, α'-azobisisobutyronitrile, t-butylperoxy-2-ethyl hexanoate and 3,5,5-trimethylhexanoyl peroxide. Among these, α, α'-azobisisobutyronitrile may preferably be used.

The amount of the radical polymerization initiator used is 0.01 to 3 parts by mass, preferably 0.05 to 2 parts by mass, particularly preferably 0.1 to 1.5 parts by mass per 100 parts by mass of the crosslinkable polymerizable monomer composition.

In the emulsion polymerization reaction for obtaining the hollow polymer particles, a suspension-protecting agent or surfactant is also preferably used for the purpose of enhancing the stability of the polymerization reaction system, in addition to an emulsifier used in the emulsion polymerization reaction for obtaining the seed particles.

In the present invention, that commonly used may be used as the surfactant. As examples thereof, may be mentioned anionic surfactants such as sodium dodecylbenzenesulfonate, sodium laurylsulfate, sodium dialkylsulfosuccinates and naphthalenesulfonate-formalin condensates.

Nonionic surfactants such as polyoxyethylene nonyl phenyl ether, polyethylene glycol monostearate and sorbitan monostearate may also be used in combination.

As examples of preferable suspension-protecting agents, may be mentioned polyvinyl alcohol, carboxymethyl cellulose, sodium polyacrylate and finely powdered inorganic compounds.

In the present invention, in the seed particles, to which the crosslinkable polymerizable monomer composition is added, a suitable oily substance may be absorbed together with the crosslinkable polymerizable monomer composition or prior to the addition of the monomer composition. By using such an oily substance in a proportion of, for example, 50 to 500% by mass based on the mass of the seed particles, the polymer particles formed can be surely provided as hollow polymer particles having a cavity within them.

As examples of the oily substance, may be mentioned benzene, toluene, xylene, butane, pentane, hexane, cyclohexane, carbon disulfide, carbon tetrachloride, lard, olive oil, coconut oil, castor oil, cottonseed oil and kerosene.

Incidentally, the surfaces of the hollow polymer particles according to the present invention may also be modified by a publicly known method, for example, by using the hollow polymer particles as seed particles to additionally polymerize a monomer.

The hollow polymer-particles according to the present invention are preferably such that a temperature ($T_{10}$), at which the weight loss of the hollow polymer particles amounts to 10% by mass when the hollow polymer particles are heated at a heating rate of 10° C./min by a thermalbalance under a nitrogen atmosphere, is at least 300° C., particularly at least 350° C. This temperature can be controlled to at least 300° C. by, for example, controlling the amount of the crosslinkable monomer used.

In the hollow polymer particles according to the present invention, the conditions ($T_{10}$ is at least 300° C.) relating to the weight loss are particularly required when they are used as, for example, a light-scattering material in light-scattering sheets made of engineering plastics or polyamide.

In the emulsion polymerization reaction for obtaining the hollow particles of the crosslinked polymer, the amount of the aqueous medium composed of water used is 20 to 100 parts by mass, preferably 30 to 50 parts by mass per 1 part by mass of the seed particles.

With respect to the polymerization conditions in this emulsion polymerization reaction, the temperature is 60 to 140° C., preferably 70 to 100° C., and the polymerization time is 0.1 to 10 hours, preferably 0.2 to 4 hours.

The hollow polymer particles according to the present invention have high degree of whiteness in appearances because their particle diameter distribution is narrow and content of particles, which are not hollow, and having a fine particle diameter is low. In addition, they cause no clogging when an ink containing the hollow polymer particles is used in, for example, an ink-jet printer because the content of coarse particles is low, so that such an ink achieves good flying ability. Further, coated paper coated with a coating material containing the hollow polymer particles has good writing property by a ball-point pen.

The ink according to the present invention is an aqueous dispersion comprising the hollow polymer particles composed of the crosslinked polymer obtained in the above-described manner and may also contain a binder, a dye, a pigment and publicly known additives in addition to the hollow polymer particles and aqueous medium.

In the ink according to the present invention, the hollow polymer particles function as a white pigment, whereby the ink according to the present invention has excellent degree of whiteness because the hollow polymer particles are contained as the whole or a part of pigments making up the ink.

In the ink according to the present invention, the hollow polymer particles are not dissolved or deformed when they are brought into contact with, for example, an organic solvent or the like because the hollow polymer particles are composed of the crosslinked polymer. As a result, the ink has a merit that the degree of whiteness is stably retained.

The content of the hollow polymer particles in the ink according to the present invention is generally 0.1 to 50% by mass, preferably 1 to 30% by mass, in terms of solid, based on the total mass of the ink. If this content is lower than 0.1% by mass, the resulting ink becomes low in degree of whiteness. If the content exceeds 50% by mass, the storage stability as an ink may be deteriorated in some cases.

In the ink according to the present invention, no particular limitation is imposed on the binder incorporated as needed. As examples thereof, may be mentioned styrene/acrylic acid copolymer resins, polyvinyl pyrrolidone resins, urethane resins, acrylic resins, styrene/maleic acid copolymer resins, α-olefin/maleic acid copolymer resins, vinyl acetate resins, polyvinyl butyral resins and sulfonated isoprene/styrene copolymer resins. The content of the binder in the ink is generally 1 to 20% by mass, preferably 2 to 10% by mass. If this content is lower than 1% by mass, the resulting ink becomes low in fixing ability. If the content exceeds 20% by mass, the storage stability as an ink may be deteriorated in some cases.

In the ink according to the present invention, no particular limitation is imposed on the dye incorporated as needed. As examples thereof, may be mentioned hydrophilic dyes, lipophilic dyes, disperse dyes, direct dyes, acid dyes and basic dyes.

As examples of the disperse dyes, may be mentioned C.I. Disperse Yellow 5, 42, 54, 64, 79, 82, 83, 93, 100, 122, 124, 126, 160, 184, 199, 204 and 224; C.I. Disperse Orange 13, 29, 31, 33, 49, 54, 55, 66, 73, 118 and 163; C.I. Disperse Red 60, 72, 73, 86, 88, 91, 92, 93, 111, 126, 127, 134, 135, 145, 164, 177, 181, 204, 206, 207, 239, 240, 283, 323, 343 and 362; C.I. Disperse Blue 56, 60, 73, 87, 113, 128, 143, 148, 154, 158, 197, 198, 201, 257, 266, 287, 354 and 365; and C.I. Disperse Green 9.

As examples of the lipophilic dyes, may be mentioned C.I. Solvent Black 3, 7, 27, 29 and 34; C.I. Solvent Yellow 14, 16, 19, 29, 56, 82 and 162; C.I. Solvent Red 1, 3, 8, 18, 24, 27, 43, 51 and 72; and C.I. Solvent Blue 2, 11 and 70.

As examples of the direct dyes, may be mentioned C.I. Direct Black 19.

As examples of the acid dyes, may be mentioned C.I. Acid Black 2 and 12; C.I. Acid Yellow 23; C.I. Acid Red 51, 87 and 92; and C.I. Acid Blue 1, 9 and 74.

As examples of the basic dyes, may be mentioned C.I. Basic Yellow 2 and 11; C.I. Basic Red 1 and 13; and C.I. Basic Blue 5, 7, 9 and 26.

The above-mentioned dyes may be used either singly or in any combination thereof.

In the ink according to the present invention, as examples of the pigment used as needed, may be mentioned azo pigments such as insoluble azo pigments, condensation azo pigments, azo lake and chelate azo pigments; polycyclic pigments such as phthalocyanine pigments, perylene and perynone dyes, anthraquinone dyes, quinacridone pigments, dioxazine pigments, thioindigo pigments, isoindolinone pigments and quinophthalone pigments; organic pigments such as dye lake, nitro pigments, nitroso pigments, aniline black and fluorescent pigments; and titanium oxide, iron oxides and carbon black.

The above-mentioned pigments may be used either singly or in any combination thereof.

The above-described dyes and pigments may be used singly, or two of them may be used. The concentration of the dye or pigment contained in the ink according to the present invention is generally 1 to 30% by mass, preferably 1.5 to 25% by mass. If the concentration of the dye or pigment is lower than 1% by mass, sufficient coloring ability cannot be achieved in the resulting ink. If the concentration exceeds 30% by mass, a coagulated product may occur in the resulting ink in some cases.

When the lipophilic dye, disperse dye or pigment is used, it is preferable to disperse them in a medium such as water in advance. In order to prepare such an aqueous dispersion, the dye or pigment may be dispersed by means of a publicly known dispersing machine such as a bead mill, sand mill, Kolese mixer, paint shaker, ultrasonic dispersing machine or high-pressure homogenizer, using a dispersing agent or the like. The aqueous dispersion of the pigment is also commercially available as an industrial product.

As a specific example of a method for mixing these raw materials for an ink, may be mentioned a method that an aqueous dispersion of the binder and hollow polymer particles is added to an aqueous solution or aqueous dispersion of the dye or pigment while stirring, and successively water and additives such as a humectant and an anti-foaming agent are put into. When a dispersion step of dispersing the lipophilic dye, disperse dye or pigment in water in advance is conducted, the addition of the binder and the additives such as the humectant and anti-foaming agent is conducted in this dispersion step, whereby a preferable ink may be provided.

As examples of publicly known additives capable of being added to the ink according to the present invention, may be mentioned humectants such as polyhydric alcohols, dispersing agents, anti-foaming agents, surface tension adjustors such as various kinds of surfactants, chelating agents, and oxygen absorbents.

As examples of the humectants, may be mentioned glycols such as ethylene glycol, propylene glycol and diethylene glycol, polyhydric alcohol ethers such as glycerol, diethylene glycol monobutyl ether, triethylene glycol monobutyl ether and carbitol, acetates, thiodiglycol, and nitrogen-containing compounds such as N-methyl-2-pyrrolidone and triethanolamine.

As examples of the dispersing agents, may be mentioned fatty acid salts, anionic surfactants such as alkylsulfonates, cationic surfactants such as aliphatic amines and quaternary ammonium salts, amphoteric surfactants such as betaine type compounds, nonionic surfactants such as fatty acid esters of polyoxyethylene compounds, and besides cellulosic polymeric substances, lignin sulfonic acid salts, polyacrylic acid salts, salts of styrene/acrylic acid copolymers, salts of styrene/maleic acid copolymers, naphthalenesulfonate-formalin condensates, polyvinyl alcohol, and polyethylene glycol.

In the production of the ink, a filtration step is preferably provided. In the filtration step, mesh of stainless steel, nylon mesh, membrane filter, pleat filter, depth filter, ceramic membrane filter or the like may be used as a filter medium, and a batch system, continuous system, circulation system or the like may be preferably used as a filtration system. It is industrially preferable to utilize a circulation system making use of the depth filter.

The ink according to the present invention preferably satisfies specific physical properties. For example, an ink used in an ink-jet system is required to have proper viscosity and surface tension. The viscosity of the ink for ink-jet recording is generally 0.7 to 15 mPa·s, preferably 1 to 10 mPa·s at 25° C., and the surface tension of such ink is generally 20 to 70 dyn/cm, preferably 25 to 60 dyn/cm, more preferably 30 to 40 dyn/cm at 25° C.

The ink according to the present invention is particularly useful for ink-jet recording. However, it may also be used as another ink, for example, ink for a general writing utensil such as a fountain pen, ball-point pen or marking pen.

The present invention will hereinafter be described by the following examples. However, the present invention is not limited to these examples. Incidentally, all designations of "part" or "parts" and "%" as will be used in the following examples mean part or parts by mass and % by mass unless expressly noted.

The number average particle diameter, weight average molecular weight, particle diameter distribution and coarse particle content (content of particles having a particle diameter of at least 3 times of the number average particle diameter) in the examples were measured or determined in the following manner.

[Number Average Particle Diameter]

An average particle diameter of 100 particles was calculated out from an electron microscope photograph (magnifications: 5,000 to 10,000).

[Weight Average Molecular Weight]

Measured by means of gel permeation chromatography.

[Particle Diameter Distribution]

Calculated out in terms of a weight fraction of particles belonging to a range of ±10% of the average particle diameter.

[Coarse Particle Content]

A slurry was collected in an amount of about 0.002 to 0.02 g in terms of powder, the weight thereof was weighed by a high-accuracy electronic balance, and the slurry was diluted to ¹/₁,₀₀₀ with a dispersion medium (distilled water) to prepare a sample. This sample was subjected to measurement by means of a number count type particle size distribution analyzer (manufactured by Particle Sizing Systems Co.) in accordance with the SOPS (Single Optical Particle Sensing) method to count the number of particles having a particle diameter of at least 3 times of the number average particle diameter as coarse particles, contained in terms of 1 g of powder. From the measured result thus obtained, the sample was converted to a number unit equivalent to 1 g of powder based on the number average particle diameter and density of the particles to find the content of the coarse particles in accordance with the following equation (1). Incidentally, the number of the coarse particles to the 1,000,000 particles is shown in the examples.

The number of coarse particles=$a/b$     Equation (1)

wherein a is the number of the coarse particles in terms of 1 g of powder having a particle diameter of at least 3 times of the number average particle diameter, which is obtained by the number count type particle size distribution analyzer, and b is the number of particles converted to a number unit equivalent to 1 g of powder based on the number average particle diameter and density.

[Flying Ability of Ink]

One gram (in terms of solid) of the resultant hollow polymer particles were mixed with 9 g of triethylene glycol monobutyl ether, 1 g of glycerol, 3 g (in terms of solid) of an aqueous carbon dispersion, "CAB-O-JET 300" (product of CABOT Corporation, in USA) and 86 g of ion-exchanged water, and the resultant dispersion was filtered through a filter having a pore size of 5 μm to prepare a water-based ink for ink-jet having a viscosity of 3.0 mPa·s and a surface tension of 34 dyn/cm. This water-based ink was used to conduct printing on exclusive paper for ink-jet printer "Paper for PM Photograph, Gloss" (product of SEIKO EPSON CORPORATION) by means of an ink-jet printer "MC2000" (manufactured by SEIKO EPSON CORPORATION), thereby evaluating the ink as to its properties to rank as "Good" where no clogging occurred in a nozzle or "Poor" where clogging occurred in a nozzle.

In the examples, the viscosity is a value measured at 25° C. by means of a viscometer ("Model RE80L", manufactured by Toki Sangyo Co., Ltd.), and the surface tension is a value measured at 25° C. by means of a digital automatic surface interfacial tensiometer "RTM-01DC" (manufactured by RIGO CO., LTD.).

(1) Production of Seed Polymer Particles S1:

A 2-L flask was charged with 80 parts of styrene, 5 parts of methacrylic acid, 15 parts of methyl methacrylate, 1 part of α-methylstyrene dimer, 14 parts of t-dodecylmercaptan, 0.8 part of sodium dodecylbenzene-sulfonate, 1.0 part of potassium persulfate and 200 parts of water, and the resultant mixture was heated to 80° C. under nitrogen gas while stirring it to conduct emulsion polymerization for 6 hours, thereby obtaining polymer particles having an average particle diameter of 0.15 μm and a weight average molecular weight (Mw) of 3,500 at a polymerization yield of 98%. The seed particles are referred to as seed-particles "S1".

(2) Production of Seed Particles S2 to S8:

Emulsion polymerizations were conducted in the same manner as in the production of the seed particles S1 except that non-crosslinkable polymerizable monomer compositions of their corresponding formulations shown in the following Table 1 were used, thereby obtaining seed particles S2 to S8.

Incidentally, the seed particles S5, S7 and S8 are for the sake of comparison. Specifically, the seed particle S5 are composed of particles of a polymer having a too high weight average molecular weight, both seed particles S7 and S8 are those obtained by emulsion polymerizations making no use of the specific chain transfer agent such as α-methylstyrene dimer.

TABLE 1

| Seed particles | Non-crosslinkable-polymerizable monomer composition (parts) | | | | | | Number average particle diameter (μm) | Weight average molecular weight (Mw) |
| --- | --- | --- | --- | --- | --- | --- | --- | --- |
| | ST | MMA | MAA | AN | AA | α-MSD | | |
| S1 | 80 | 15 | 5 | — | — | 1 | 0.15 | 3,500 |
| S2 | 80 | 15 | 5 | — | — | 2 | 0.20 | 4,000 |
| S3 | 80 | 15 | 5 | — | — | 4 | 0.20 | 6,000 |
| S4 | 80 | 7 | — | 8 | 5 | 1 | 0.55 | 6,000 |
| S5 | 100 | — | — | — | — | 1 | 0.25 | 31,000 |
| S6 | 95 | — | — | — | 5 | 1 | 0.04 | 3,000 |
| S7 | 80 | 15 | 5 | — | — | — | 0.20 | 5,000 |
| S8 | 80 | 15 | — | — | 5 | — | 0.30 | 6,000 |

The symbols in Table 1 have the following respective meanings.

ST: Styrene
MMA: Methyl methacrylate
MAA: Methacrylic acid
AN: Acrylonitrile
AA: Acrylic acid
α-MSD: α-Methylstyrene dimer (3) Production of Hollow Polymer Particles:

EXAMPLE 1

A reaction vessel was charged with 10 parts (in terms of solid) of the seed particles S1, 0.3 parts of sodium laurylsulfate, 0.5 parts of potassium persulfate and 400 parts of water. To the resultant mixture, was added a crosslinkable polymerizable monomer composition composed of a mixture of 11.6 parts of divinylbenzene (purity: 55%; the residue was a monofunctional vinyl monomer), 8.4 parts of ethylvinylbenzene, 5 parts of acrylic acid and 75 parts of methyl methacrylate to stir the contents for 1 hour at 30° C., thereby causing almost all of the crosslinkable polymerizable monomer composition to be absorbed in the seed particles, and an emulsion polymerization treatment was conducted for 5 hours at 70° C. with stirring. As a result, an aqueous dispersion of capsule-like polymer particles containing water inside of the particles was obtained at a polymerization yield of 99%.

The reaction product was subjected to a filtration treatment through a 200-mesh filter. As a result, it was confirmed that the amount of a coagulated product of the polymer captured on the filter was 0.02% based on the total weight of the polymer solids, and so the polymerization stability was good.

This aqueous dispersion was dried to observe it with a transmission electronic microscope. As a result, it was confirmed that the polymer particles were completely spherical, hollow polymer particles having an outer diameter of 0.35 μm and an inner diameter of 0.20 μm, and the central portion of the particle was semitransparent in appearance thereof.

The resultant hollow polymer particles were used as a component of an ink composition to evaluate. As a result, it was confirmed that excellent flying property was achieved.

The results described above are shown in Table 2-1. Incidentally, the term "Capsule-like" in the following Tables means a state that a cavity has been formed within the individual polymer particles.

EXAMPLE 2 TO 8 AND COMPARATIVE EXAMPLES 1 TO 4

Crosslinkable polymerizable monomer compositions were subjected to emulsion polymerization treatments in the same manner as in Example 1 except that the seed particles of their corresponding kinds and amounts shown in Table 2-1, Table 2-2 and Table 3 were used, that 100 parts of crosslinkable polymerizable monomer compositions of their corresponding formulations shown in Table 2-1, Table 2-2 and Table 3 were used, and that the amounts of the surfactants were adjusted, thereby obtaining polymer particles.

However, in Example 4, the emulsion polymerization treatment was conducted by adding the crosslinkable polymerizable monomer composition after 10 parts of toluene was absorbed in 12 parts of the seed particles S2, and in Example 5, the emulsion polymerization treatment was conducted by adding the crosslinkable polymerizable monomer composition after 10 parts of dibutyl phthalate was absorbed in 13 parts of the seed particles S2.

The results are shown in Table 2-1, Table 2-2 and Table 3.

EXAMPLE 9

A reaction vessel was charged with 2 parts (in terms of solid) of the seed particles S1, 20 parts of polyvinyl alcohol ("Gohsenol GH20", product of The Nippon Synthetic Chemical Industry Co., Ltd.), 2 parts of 3,5,5-trimethylhexanoyl peroxide ("PEROYL 355", product of Nippon Oil & Fats Co., Ltd.) as a polymerization initiator and 500 parts of water. To the resultant mixture, was added a mixture obtained by mixing 400 parts of toluene, as an oily substance with a crosslinkable polymerizable monomer composition composed of a mixture of 25 parts of ethylene dimethacrylate, 5 parts of methacrylic acid and 70 parts of methyl methacrylate, to stir the contents for 2 hours at 40° C., thereby causing the crosslinkable polymerizable monomer composition to be absorbed in the seed particles, and an emulsion polymerization treatment was conducted for 15 hours at 70° C. with stirring. As a result, an aqueous dispersion of capsule-like polymer particles containing toluene inside of the particles was obtained at a polymerization yield of 98%.

The data of the polymer particles and the result of the flying property are shown in Table 2-2.

TABLE 2-1

| | | Example | | | | |
|---|---|---|---|---|---|---|
| | | Example 1 | Example 2 | Example 3 | Example 4 | Example 5 |
| | Seed particles | S1 | S2 | S3 | S2 | S2 |
| | Amount (parts) | 10 | 10 | 10 | 12 | 13 |
| Crosslinkable-polymerizable monomer composition | Crosslinkable monomer | | | | | |
| | DVB | 11.6 | 11.6 | 11.6 | 17.4 | 17.4 |
| | EDMA | | | | | |
| | (Other monomer) | | | | | |
| | Styrene | | | 5 | | |
| | Ethylvinyl benzene | 8.4 | 8.4 | 8.4 | 12.6 | 12.6 |
| | (Hydrophilic monomer) | | | | | |
| | Acrylic acid | 5 | | 5 | | |
| | Methacrylic acid | | 5 | | 5 | 5 |
| | Methyl methacrylate | 75 | 75 | 70 | 65 | 65 |
| | Oily substance | | | | Toluene | DBPH |
| | Amount (parts) | | | | 10 | 10 |
| Polymer particle | Form | Capsule-like containing water | Capsule-like containing water | Capsule-like containing water | Capsule-like containing oil | Capsule-like containing oil |
| | Inner diameter (μm) | 0.20 | 0.30 | 0.30 | 0.30 | 0.30 |
| | Outer diameter (μm) | 0.35 | 0.40 | 0.40 | 0.40 | 0.40 |
| | Particle diameter distribution | 77 | 71 | 91 | 69 | 55 |
| | Occurance of new particles | None | None | None | None | None |

TABLE 2-1-continued

|  | | Example | | | | |
|---|---|---|---|---|---|---|
|  | | Example 1 | Example 2 | Example 3 | Example 4 | Example 5 |
| Coarse particle content (ppm) | | 2.5 | 3.3 | 3.6 | 1.5 | 0.9 |
| Flying property of ink | | good | good | good | good | good |

DVB: Divinyl benzene
EDMA: Ethylene glycol dimethacrylate
DBPH: Dibutyl phthalate

TABLE 2-2

|  |  |  | Example | | | |
|---|---|---|---|---|---|---|
|  |  |  | Example 6 | Example 7 | Example 8 | Example 9 |
|  | Seed particles | | S4 | S6 | S1 | S1 |
|  | Amount (parts) | | 10 | 10 | 5 | 2 |
| Crosslinkable-polymerizable monomer composition | Crosslinkable monomer | | | | | |
|  |  | DVB | 11.6 | 11.6 | 11.6 | |
|  |  | EDMA | | | | 25 |
|  | (Other monomer) | | | | | |
|  |  | Styrene | | 5 | | |
|  |  | Ethylvinyl benzene | 8.4 | 8.4 | 8.4 | |
|  | (Hydrophilic monomer) | | | | | |
|  |  | Acrylic acid | | 5 | 5 | |
|  |  | Methacrylic acid | 5 | | | 5 |
|  |  | Methyl methacrylate | 75 | 70 | 75 | 70 |
|  | Oily substance | | | | | Toluene |
|  | Amount (parts) | | | | | 400 |
| Polymer particle | Form | | Capsule-like containing water | Capsule-like containing water | Capsule-like containing water | Capsule-like containing oil |
|  | Inner diameter (μm) | | 0.70 | 0.05 | 0.25 | 0.75 |
|  | Outer diameter (μm) | | 1.10 | 0.11 | 0.43 | 0.90 |
|  | Particle diameter distribution | | 91 | 88 | 70 | 66 |
|  | Occurance of new particles | | None | None | None | None |
|  | Coarse particle content (ppm) | | 3.5 | 1.3 | 4.1 | 3.1 |
| Flying property of ink | | | good | good | good | good |

DVB: Divinyl benzene
EDMA: Ethylene glycol dimethacrylate

TABLE 3

|  |  |  | Comparative example | | | |
|---|---|---|---|---|---|---|
|  |  |  | Comparative example 1 | Comparative example 2 | Comparative example 3 | Comparative example 4 |
|  | Seed particles | | S5 | S7 | S8 | SS |
|  | Amount (parts) | | 10 | 10 | 10 | 10 |
| Crosslinkable-polymerizable monomer composition | Crosslinkable monomer | | | | | |
|  |  | DVB | 11.6 | 11.6 | 11.6 | 11.6 |
|  |  | EDMA | | | | |
|  | (Other monomer) | | | | | |
|  |  | Styrene | | | | |
|  |  | Ethylvinyl benzene | 8.4 | 8.4 | 8.4 | 8.4 |
|  | (Hydrophilic monomer) | | | | | |
|  |  | Acrylic acid | | | 5 | |
|  |  | Methacrylic acid | 5 | 5 | | 5 |
|  |  | Methyl methacrylate | 75 | 75 | 75 | 75 |

TABLE 3-continued

|  |  | Comparative example | | | |
|---|---|---|---|---|---|
|  |  | Comparative example 1 | Comparative example 2 | Comparative example 3 | Comparative example 4 |
|  | Oily substance Amount (parts) | — | — | — | — |
| Polymer particle | Form | Capsule-like containing water | Capsule-like containing water | Capsule-like containing water | No cavity |
|  | Inner diameter (μm) | 0.10 | 0.30 | 0.45 | — |
|  | Outer diameter (μm) | 0.50 | 0.40 | 0.61 | 0.40 |
|  | Particle diameter distribution | 30 | 35 | 40 | 91 |
|  | Occurance of new particles | Observed | None | Observed | None |
|  | Coarse particle content (ppm) | 1.1 | 8.3 | 10.1 | 4.4 |
|  | Flying property of ink | good | good | good | good |

DVB: Divinyl benzene
EDMA: Ethylene glycol dimethacrylate
SS: Polymer particle (STADEX SC-020-S) (product of JSR Corporation)

It is understood from the results shown in Table 2-1 and Table 2-2 that, according to the present invention, hollow polymer particles composed of a crosslinked polymer and having a small particle diameter, a comparatively narrow particle diameter distribution and high uniformity of particle diameter are provided.

In addition, it is apparent that the hollow polymer particles according to the present invention are useful as materials of inks especially for ink-jet printers, and inks exhibiting particularly high flying property can be produced therewith.

As understood from the results shown in Table 3 on the other hand, the hollow polymer particles according to Comparative Example 1 are such that the particle diameter distribution thereof is wide, new particles also occur, and cavity present within the particles is small. The reason for it is that the seed particles S5 composed of a polymer having a higher weight average molecular weight of 31,000 is used.

The hollow polymer particles according to Comparative Example 2 are wide in particle diameter distribution, and the hollow polymer particles according to Comparative Example 3 are such that the particle diameter distribution thereof is wide, and occurrence of new particles is observed. The reason therefor is that the seed particles S7 and S8 prepared without using the specific chain transfer agent are respectively used as the seed particles in Comparative Examples 2 and 3.

Since polymer particles "JSR STADEX SC-020-S" composed of polystyrene having a higher weight average molecular weight of 100,000 or higher are used as the seed particles in Comparative Example 4, no cavity is present within the resultant polymer particles.

Effects of the Invention:

According to the present invention, hollow polymer particles composed of a crosslinked polymer and having a small particle diameter, a comparatively narrow particle diameter distribution and high uniformity of particle diameter can be easily and surely provided.

Since the hollow polymer particles are composed of a crosslinked polymer, they are basically excellent in hardness, mechanical strength, heat resistance and solvent resistance of the particles themselves and exhibit high coating property and shielding property.

Accordingly, the hollow polymer particles according to the present invention can be suitably applied to various uses as materials for various kinds of inks or paints, for example, coating materials for a light-scattering sheet, an electronic paper, a paper for ink-jet printers or a paper for thermal transfer printers, and extended-release materials for drugs, whitening agents, etc. utilizing the properties thereof. Besides, they may also be usefully used in other uses than those described above.

What is claimed is:

1. A process for producing a hollow polymer particle; comprising
   emulsion-polymerizing 100 parts by mass of a non-crosslinkable monomer in the presence of 0.01 to 5 parts by mass of a chain transfer agent composed of at least one compound selected from the group consisting of α-methylstyrene dimer, thiuram disulfides and terpene hydrocarbons to obtain a seed particle which is a particle of a polymer having a weight average molecular weight of 500 to 15,000; and
   adding a crosslinkable polymerizable monomer composition comprising a crosslinkable monomer component and a hydrophilic monomer component to an aqueous dispersion of the seed particle to subject the monomer composition to an emulsion polymerization treatment in a state absorbed in the seed particle.

2. The production process of the hollow polymer particle according to claim 1, wherein the crosslinkable monomer contained in the crosslinkable polymerizable monomer composition is divinylbenzene.

3. The production process of the hollow polymer particle according to claim 1, wherein the hydrophilic monomer is at least one selected from the group consisting of vinylpyridine, acrylonitrile, methyl methacrylate, 2-hydroxyethyl methacrylate, acrylic acid and methacrylic acid.

4. The production process of the hollow polymer particle according to claim 2, wherein the hydrophilic monomer is at least one selected from the group consisting of vinylpyridine, acrylonitrile, methyl methacrylate, 2-hydroxyethyl methacrylate, acrylic acid and methacrylic acid.

5. The production process of the hollow polymer particle according to claim 1, wherein the crosslinkable polymerizable monomer composition is added in a proportion of 2 to 500 parts by mass per 1 part by mass of the seed particle.

6. The production process of the hollow polymer particle according to claim 2, wherein the crosslinkable polymerizable monomer composition is added in a proportion of 2 to 500 parts by mass per 1 part by mass of the seed particle.

7. The production process of the hollow polymer particle according to claim 1, wherein the seed particle has a number average particle diameter of 0.05 to 1.5 μm.

8. The production process of the hollow polymer particle according to claim 2, wherein the seed particle has a number average particle diameter of 0.05 to 1.5 μm.

9. The production process of the hollow polymer particle according to claim 1, wherein the seed particle is composed of a polymer formed of an ethylenic unsaturated monomer.

10. The production process of the hollow polymer particle according to claim 2, wherein the seed particle is composed of a polymer formed of an ethylenic unsaturated monomer.

11. The production process of the hollow polymer particle according to claim 1, wherein in the crosslinkable polymerizable monomer composition, the proportion of the crosslinkable monomer component is 1 to 50% by mass, and the proportion of the hydrophilic monomer component is 1 to 99% by mass.

12. The production process of the hollow polymer particle according to claim 2, wherein in the crosslinkable polymerizable monomer composition, the proportion of the crosslinkable monomer component is 1 to 50% by mass, and the proportion of the hydrophilic monomer component is 1 to 99% by mass.

13. The production process of the hollow polymer particle according to claim 1, wherein the emulsion polymerization treatment is conducted in a state that the crosslinkable polymerizable monomer composition and an oily substance have been absorbed in the seed particle.

14. The production process of the hollow polymer particle according to claim 2, wherein the emulsion polymerization treatment is conducted in a state that the crosslinkable polymerizable monomer composition and an oily substance have been absorbed in the seed particle.

* * * * *